United States Patent
Rosenqvist et al.

(10) Patent No.: US 6,590,612 B1
(45) Date of Patent: Jul. 8, 2003

(54) OPTICAL SYSTEM AND METHOD FOR COMPOSING COLOR IMAGES FROM CHROMATICALLY NON-COMPENSATED OPTICS

(75) Inventors: Anders Rosenqvist, Lund (SE); Martin Almers, Lund (SE); Daniel Elvin, Lund (SE); Per Sennmalm, Lund (SE); Christer Fåhraeus, Lund (SE)

(73) Assignee: Cellavision AB, Lund (SE)

( * ) Notice: Subject to any disclaimer, the term of this patent is extended or adjusted under 35 U.S.C. 154(b) by 0 days.

(21) Appl. No.: 09/271,828

(22) Filed: Mar. 18, 1999

(51) Int. Cl.$^7$ .............................. H04N 5/232; H04N 7/18
(52) U.S. Cl. .......................................... 348/349; 348/79
(58) Field of Search ............................ 348/79, 80, 335, 348/340, 345, 349, 351, 354–356; 382/254, 255, 260, 263; H04N 5/232, 7/18

(56) References Cited

U.S. PATENT DOCUMENTS

| | | | | |
|---|---|---|---|---|
| 3,953,729 A | | 4/1976 | Hosoe et al. ............ 250/201.7 |
| 4,186,301 A | * | 1/1980 | Basire ........................ 348/353 |
| 4,209,241 A | | 6/1980 | Nanba et al. ................ 396/110 |
| 4,851,900 A | * | 7/1989 | Edwards ...................... 348/79 |
| 5,101,277 A | * | 3/1992 | Kanata ........................ 348/349 |
| 5,369,436 A | | 11/1994 | Kawakami et al. ......... 348/355 |
| 5,452,005 A | | 9/1995 | Kubo et al. ................. 348/350 |
| 6,268,611 B1 | * | 7/2001 | Pettersson ................. 250/559.3 |
| 6,341,180 B1 | * | 1/2002 | Pettersson ................... 382/255 |

* cited by examiner

*Primary Examiner*—Ngoc-Yen Vu
(74) *Attorney, Agent, or Firm*—Cooper Dunham LLP

(57) ABSTRACT

An image processing system for optical systems including microscopes which separately captures (grabs) different portions of the electromagnetic spectrum as emitted from an object as separate images. Each of the separate images are individually focused and then aligned with the other images to produce a composite image. In one embodiment, the different portions correspond to red, green, and blue and the composite image is displayed to the user on as a monitor without any need for an eyepiece.

20 Claims, 3 Drawing Sheets

OPTICAL SYSTEM AND METHOD FOR COMPOSING COLOR IMAGES FROM CHROMATICALLY NON-COMPENSATED OPTICS

FIELD OF THE INVENTION

The present invention relates to image processing systems for microscopes or other optical systems and, more particularly, to image processing systems which compose color images from low-cost optical systems using multiple wavelength illumination.

BACKGROUND OF THE INVENTION

Traditional high performance wide-field microscopes 10 as shown in FIG. 1, achieve a high resolution color image of a specimen (object) 16 with a wide field of view of the object information 18. Also, by means of a beam splitter 24, the image 22, 26, 30 is fed simultaneously to both a video camera 32 and to an eyepiece 28. The focusing 48, 52 is often performed using a manual focus controller 46. However, autofocus controllers 42 which use the digital image context or additional optics can also be employed to send focusing commands 44 through a selector 50 to control the focusing mechanism 54.

With such microscopes, a user can look: (1) through the eyepiece 28; (2) at a video monitor 40 connected to the camera 32; or (3) at a computer monitor 70 connected through a frame grabber 62 and an image processor 66 to the camera 32. However, looking through an eyepiece strains the eyes, neck, and shoulders of the user. In addition, when two or more persons wish to view an image simultaneously, viewing the image through a monitor 40, 70 is clearly superior. Therefore, a high quality image on a monitor screen is preferable. Further, a computer 60, in addition to grabbing, storing, processing and presenting images, can use the output 34 from a camera 32 for image analysis.

However, the complexity and cost of such traditional high performance wide-field microscope systems is considerable. For example, such traditional microscopes provide illumination 14 using a white light source 12 such as a filament bulb. Such bulbs are not energy efficient. In addition, the color temperature of the bulb, which affects the color balance in the image, changes as the bulb ages.

Another costly requirement of traditional microscopes is that to get a good quality electronic image, one usually employs a relatively expensive three-chip RGB (red, green, blue) camera 32. Such a camera has internal prisms and filters to separate colors, one color for each of three black and white sensors. However, maintaining the relative positions and orientations of the prisms, filters and sensors during the lifetime of the camera is complex.

Also, for traditional microscopes, the most complex component is the objective (lens) 20 between the bulb 12 and the camera 32. Since the bulb provides white light, a traditional objective 20 is usually color compensated to supply an image for an eyepiece. In other words, the objective 20 has to produce reasonably sharp images 22 for the whole spectrum of interest at the same time. This spectrum is typically the entire visible spectrum.

To achieve the requirements for a microscope, the color compensated wide field objective 20 of a traditional microscope 10 is a compromise to achieve: (1) color compensation; (2) wide field of view; (3) magnification of 50–100 times; and (4) a numerical aperture which typically is 0.9 for a dry (air immersion) objective and 1.3 for an oil immersion objective.

To provide the compromise for a variety of conditions, traditional microscope systems are often equipped with a number of different objectives, for example, to adapt to the thickness of an optional glass cover slip or to provide overview images using a low magnifying objective. Such different objectives require the individual lens elements to be aligned with tight tolerances.

Also, even with the best possible objectives for visual light, some details of the image remain just beyond visibility. Therefore, a common image processing step is 'image sharpening' of captured images 64 performed by an image processor 66. For example, by amplifying the higher spatial frequencies in an image, small details and edges become enhanced in the sharpened image 68. Selection of such frequency dependent amplification for the sharpening filter can be optimized if the characteristics of the objective are known. However, the objective characteristics are wavelength dependent, and therefore, ideally, each wavelength should have a respective sharpening filter.

Unfortunately, such separate sharpening filters are difficult to achieve with an RGB camera because each color component of the camera responds to light with a spectrum width of typically +/−50 nanometers which causes overlap between the colors. Thus, for example, the green component may respond to light with wavelengths extending from approximately 500 to 600 nanometers. Accordingly, once a sensor of the camera 32 has been exposed to white light, each wavelength's contribution to the blurring of the image caused by the objective can not be determined and therefore the characteristics for a sharpening filter optimized for a wavelength can not be determined. Thus, a sharpening filter for such a system can only be a compromise.

Accordingly, traditional microscopes fail to provide a low cost system having a computer which generates high performance digital microscope images without filament bulbs and three-chip cameras. Such traditional microscopes also fail to permit the use of a simple objective which is suitable for wavelength tailored image sharpening filters.

SUMMARY OF THE INVENTION

This invention provides a novel design for a low-cost system for digital image microscopy. The system has a performance comparable to that of a much more expensive traditional microscope. Also, the invention can be used to improve the performance of an existing microscope system.

One object of the invention is to generate high quality microscope images on a computer screen to obviate any need of the user to look through the eyepiece. Accordingly, the invention does not provide a direct optical path from the specimen to a user's eyes, but instead lets the images pass through a camera and an image processing computer.

Another object of the invention is to provide an optical system having: (1) an objective which receives electromagnetic radiation from an object, modifies the electromagnetic radiation, and emits the modified electromagnetic radiation as an image of the object; (2) a focusing mechanism which controls the movement of the objective along at least one path to modify the image; (3) one or more cameras which detect separate images for each of a plurality of frequency bands of the modified electromagnetic radiation of the image emitted by the objective; and (4) an automatic focus controller which, in accordance with the detected images: (a) provides control parameters to the focusing mechanism; and (b) determines for each of the frequency bands, an optimal image which corresponds to an optimal focus of the objective for that frequency band. The images can be detected/ captured at different times. Also, the camera can be one or more black and white cameras.

A further object of the invention is to provide an automatic focus controller having: (1) a filter calculator for receiving the detected images as image signals and for generating filtered image signals such that noise components of the image signals have been reduced, the noise components being reduced by increasing energy contributions from parts of the image signals which contribute a relatively larger proportion to image components than the noise components and by decreasing energy contributions from other parts of the image signals which contribute a relatively larger portion to the noise components than to the image components; (2) an energy calculator for receiving the filtered image signals and determining energy levels of the filtered image signals; and (3) a control calculator for receiving the energy levels and for generating the control parameters in accordance with the energy levels.

An additional object of the invention is to provide a registration controller which aligns a plurality of optimal images. This registration controller can also have: (1) a transformer for receiving a first optimal image and a transformation, and for generating a transformed image, the transformation capable of translating, rotating, and/or magnifying the first optimal image; (2) a compositor for combining a second optimal image and the transformed image to generate a composite image; (3) an energy calculator for receiving the composite image and for determining an energy level of the composite image; and (4) a transformation generator for receiving the energy level and for generating the transformation in accordance with the energy level such that the transformation selected corresponds to a focus for the composite image.

A further object of the invention is to provide one or more image sharpening filters, each filter optimized for a particular frequency band.

Another object of the invention is to provide a source of electromagnetic radiation capable of emitting electromagnetic radiation in different frequency bands and of selectively emitting electromagnetic radiation from only one of the frequency bands. This source can include a plurality of separate sources, each separate source corresponding to one or more of the different frequency bands.

An additional object of the invention is to select: (1) one or more of the frequency bands to produce a response only from respective portions of the object; and/or (2) at least three of the frequency bands to correspond to red, green, and blue color components of visible light.

A further object of the invention is to provide an objective which: (1) lacks significant color compensation; (2) is selected such that the optimal focus for each frequency band occurs at a different position along the path of the objective; (3) provides optimal focus positions which are monotonically related to the frequency bands; and/or (4) is moved in a single unidirectional movement of the objective along the path to reveal the optimal focus for each of the frequency bands.

Also, an object of the invention is to provide a converter for transforming each n by 1 pixel of a composite image using a weight matrix to generate a respective 3 by 1 pixel for an RGB image, where n is the number of frequency bands. Additionally, the RGB image can be generated to simulate cameras which are different than the camera or cameras employed in the optical system.

Another object of the invention is to provide a method for operating an optical system having the steps of: (1) illuminating an object with electromagnetic radiation from a source; (2) modifying electromagnetic radiation from the object through an objective to form an image of the object; (3) controlling the movement of the objective along at least one path to modify the image; (4) detecting separate images for each of a plurality of frequency bands of the electromagnetic radiation; (5) providing control parameters for controlling the movement of the objective; and (6) determining from the detected images for each of the frequency bands, an optimal image which corresponds to an optimal focus of the objective for that frequency band. This method can also include steps of: (1) moving the objective only in one direction to reveal the optimal focus for each of the frequency bands; (2) sharpening one or more of the optimal images using a filter optimized for the respective frequency band; and/or (3) aligning two or more of the optimal images which each other.

These objects and other objects, advantages and features of the invention will become apparent to those skilled in the art upon consideration of the following description of the invention.

DETAILED DESCRIPTION OF THE INVENTION

Figure 1:
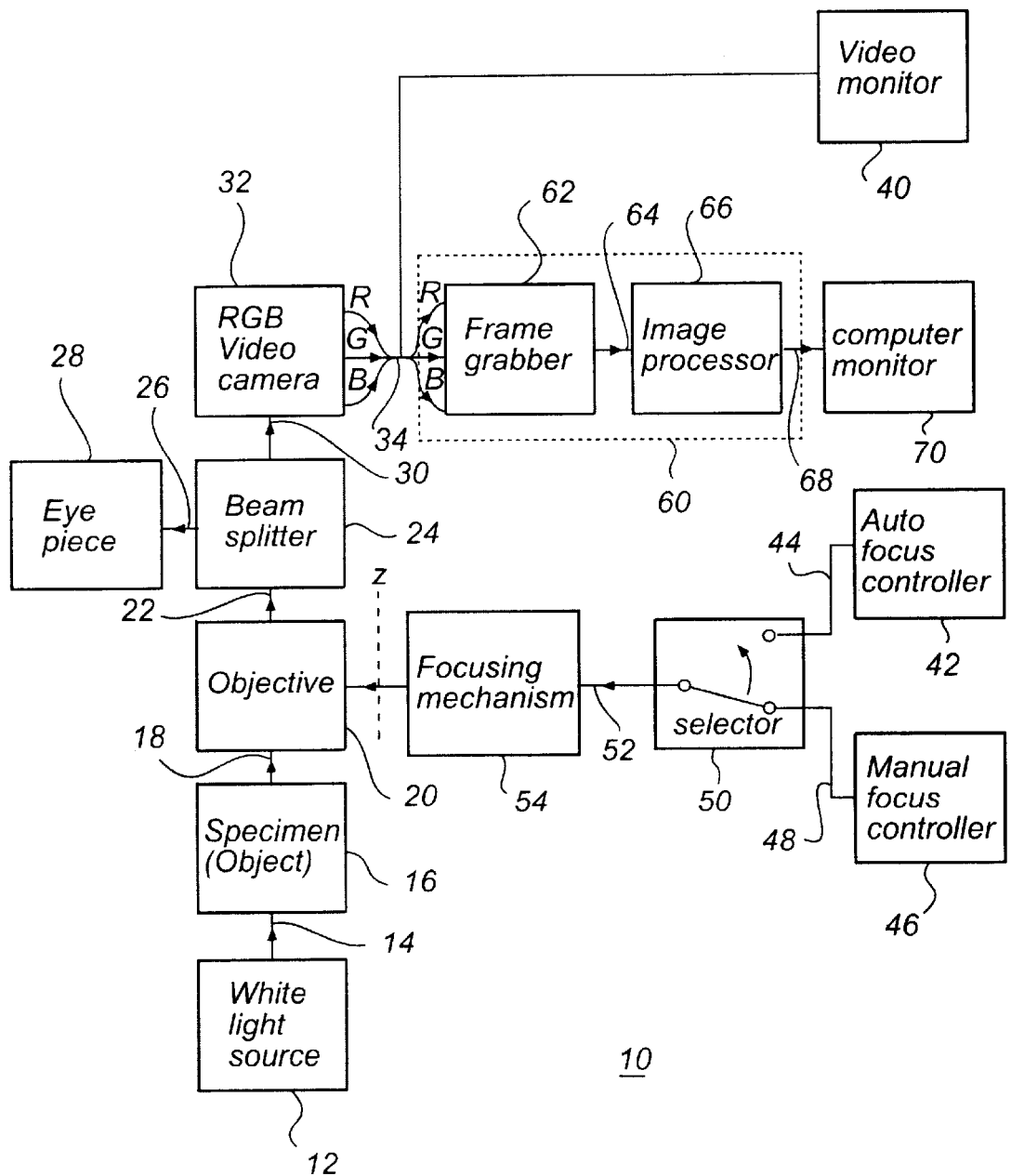
FIG. 1 is a block diagram illustrating a traditional widefield microscope system with optional modules including an RGB video camera, a video monitor, a computer, an autofocus controller and a computer monitor.
Figure 2:
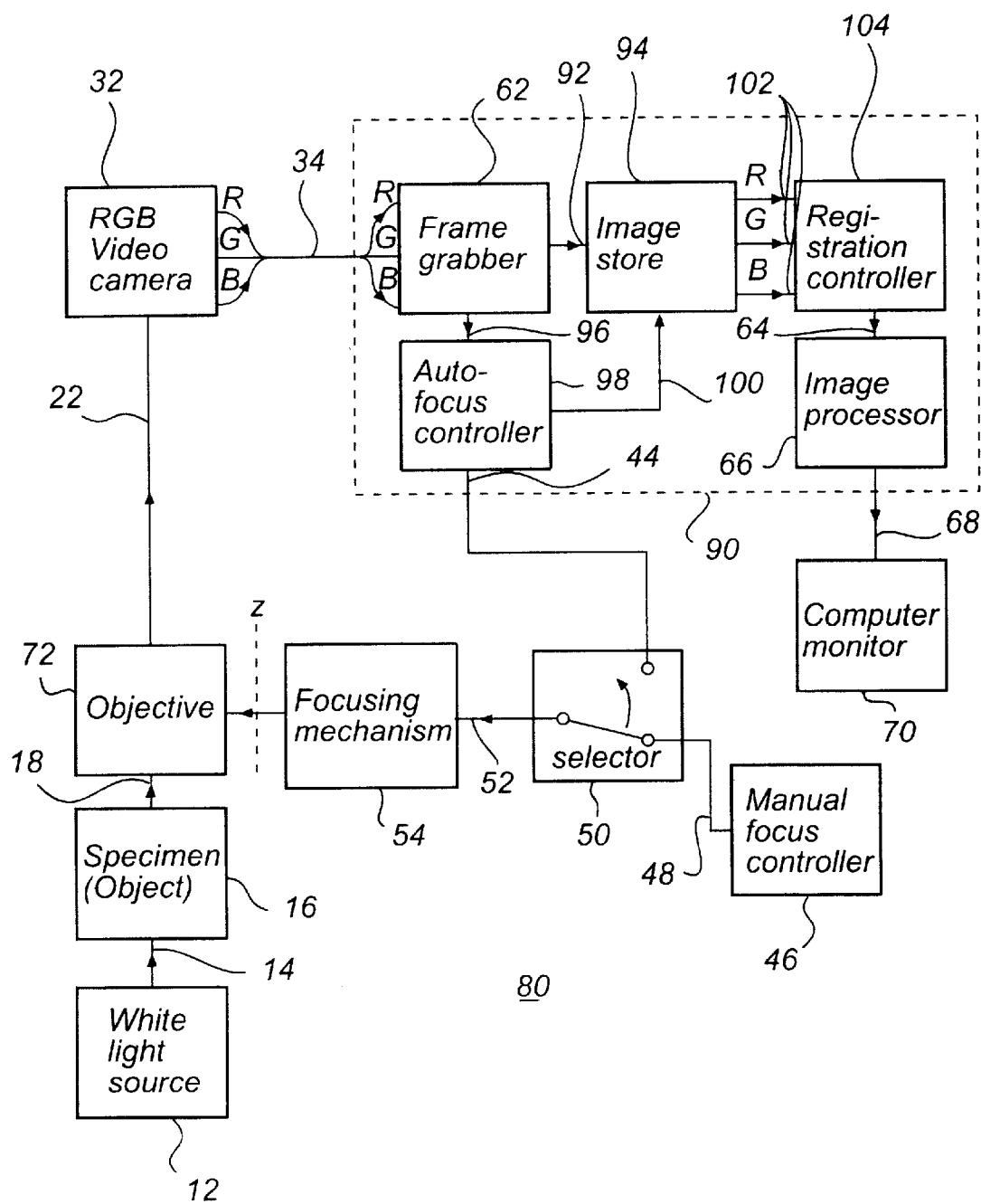
FIG. 2 is a block diagram illustrating one embodiment of the present invention in which the red, green and blue color components of an RGB camera are grabbed at different instants of time and are aligned using an image registration controller.

FIG. 2 shows a traditional microscope system that has been modified in accordance with this invention. In particular, the beam splitter 24 and the eyepiece 28 of FIG. 1 have been removed which makes the system smaller and reduces the cost of production. Also, the reduced number of optical components in the optical path improves the image quality. For reasons explained below, in this embodiment, an image store 94 and an image registration controller 104 have been added to operate with or on the computer 90 controlling the system.

For a traditional microscope having a good color compensated objective like the Olympus "UplanFl 100x/1.30 Oil", the different color components of an image from an RGB camera have slightly different vertical positions of optimal focus; in particular, the position for the blue color component is further offset from the other color components, green and red. Nevertheless, all the colors of an image from a traditional microscope are viewed simultaneously through the eyepiece 28 or the camera 32.

In contrast to the simultaneous viewing of a traditional microscope system 10, the optical system 80 according to one embodiment of this invention, grabs (views) each of the three color components 34 as separate images sequentially through the frame grabber 62. Each of the grabbed color component images 92 can be stored separately in image store 94 in accordance with a synchronization signal 100 from the autofocus controller 98.

Although the optical system 80 of this embodiment of the invention uses illumination 14 from a white light source 12 the time separated grabbing of each of the RGB components 34 with automatic refocusing between grabs allows for an optical system 80 having a computer solution, as opposed to an optical solution, for reasonable color compensation. In FIG. 2, the width of each color's frequency spectrum is determined by the wavelength dependent response of the color components of the RGB camera 32. A typical 3-chip RGB camera has color components with bandwidths that are approximately +/−50 nanometers wide.

Because each frame grab requires an auto-focus step by the autofocus controller 98, a quick and noise-insensitive image content auto-focus procedure is employed by the autofocus controller 98 for each of the grabbed color component images 96. In particular, while other auto-focus procedures can be used, one embodiment of this invention uses an auto-focus procedure that requires a single one-directional scan of the vertical position of the objective for storing each color component image at the optimal focus.

Pending U.S. patent application Ser. No. 09/212,720, filed Dec. 16, 1998, now U.S. Pat. No. 6,341,180, incorporated herein by this reference, relates to such a one-directional auto-focus search used in one embodiment of this invention. In that application, an auto-focus procedure which exploits the fact that at the optimal focus positions, the response in the spatial frequency spectrum is most clearly seen at the low and middle spatial frequencies, while the response at higher spatial frequencies are usually hidden in noise. By treating the response as a signal plus noise and by filtering the image with an optimal Wiener filter to remove the higher spatial frequencies, a focus function with an improved signal (focus response) to noise ratio is achieved. That patent application also discusses using an approximate linear digital convolution filter instead of the optimal Wiener filter to provide for quicker calculations. The approximate filter can be a linear array having only three non-zero elements, for example [1,0,0,0,2,0,0,0,1,]. Because neither the optimal Weiner filter nor the approximate filter require curve-fitting, that is, a procedure using positions on both sides of the optimal focus position, a highly repeatable or hysterisis free objective positioning mechanism is not required. Instead, the optical system only needs to retain in the image store 94 the image having the highest value of the focus function as encountered during a one-directional scan. Thus, by selecting the RGB camera, the optical system, the direction of the vertical scan, and the order in which the color components are focused and grabbed, the optimal focus for each of the optimal color component images appear one after another with negligible overlap. The result is a swift grab of all the color components.

The procedure of grabbing a color component and refocusing provides sharper color components from the RGB camera 32. However, because the color component images 92, 102 are grabbed and stored at different times and at different focus positions, the color component images 92, 102 when used together should be translated, rotated and magnified with respect to one another. If the color component images 102 are only used separately such adjustment may not be needed. However, for example, a gray scale image or a presentation of color images 68 to a user, alignment (registration) of the color component images is typically necessary. Such an alignment can be troublesome since different color components respond differently to different types of details in the object.

Pending U.S. patent application Ser. No. 09/212,730, filed Dec. 16, 1998, now U.S. Pat. No. 6,268,611 incorporated herein by this reference, relates to a robust feature-free similarity criterion for registering two dissimilar images, that is, images which do not have identical details, used in one embodiment of this invention. A similarity criterion is globally optimal when the images are best aligned. A feature-free similarity criterion does not depend on extracting special image details (features) prior to the registration. This similarity criterion consists of measuring the focus of an image composed by the two images to be registered, for example, by adding pixel-wise the two input images. By having one of the images as a reference and by transforming the other one relative to the reference image, the similarity criterion is evaluated and optimized over a number of combinations of transform parameters to determine the optimal focus which corresponds to the optimal alignment of the images.

While one embodiment of the invention applies this registration procedure to the color component images 102 in registration controller 104, other registration procedures can be employed. One reason that registration is needed is that the 3-chip camera 32 itself, due to for example vibration, shock, temperature changes, temperature gradients and aging, has components which are out of alignment and, thus, movement of the objective produces images which are not precisely aligned.

By removing the beam splitter 24 and the eyepiece 28, and at the same time adding procedures and controllers for auto-focus and registration of dissimilar images, a smaller, lower cost, more reliable and higher performance optical system 80 is provided by this invention.

In the modified system of FIG. 2, the color compensation benefits of a traditional color compensated objective 20 are not required because each color component is separately focused. Accordingly, a less color compensated objective 72 can be employed. Such an objective also reduces the overlap of the focus peaks of the different colors when scanning in the vertical direction. For example, in one embodiment of the invention a GELTECH 350140 lens is used. This lens is a non-color compensated single lens having a focus depth of a magnitude of 1 micrometer while the center of the optimal focus position monotonically changes 5–10 micrometers for each 50 nanometer change in illumination wavelength.

Figure 3:
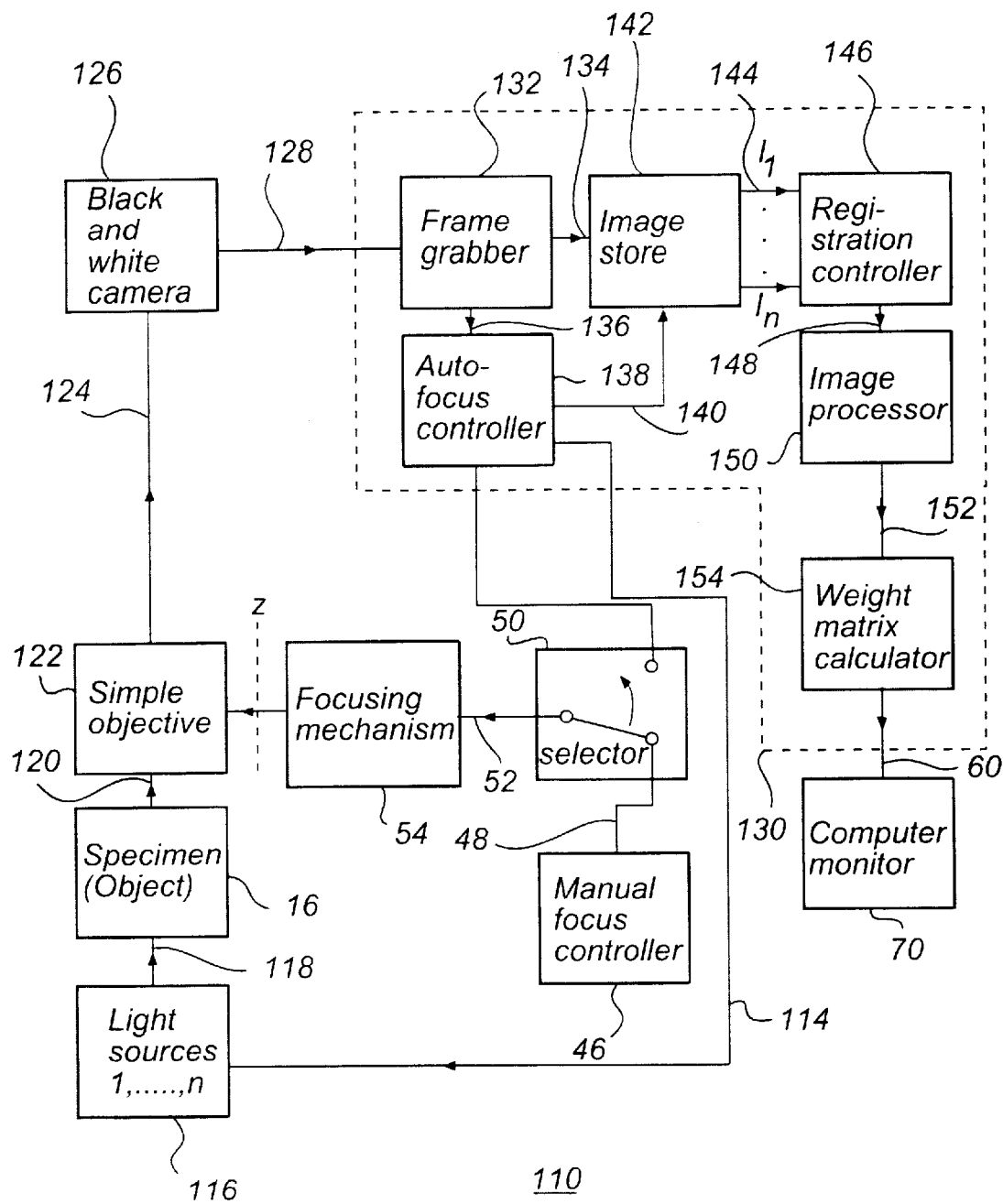
FIG. 3 is a block diagram illustrating another embodiment of the present invention in which the light source is divided into several spectra of smaller widths and which employs a simple objective and a black and white camera.

Another embodiment of this invention exploits the fact that an optical system yields sharp images over a wide range of wavelengths if only a limited spectral width is received by the objective at a time. According to this embodiment the spectrum of the illumination 118 is controlled. Such an optical system 110 is shown in FIG. 3. It operates mainly in the same way as the system in FIG. 2 except, among other differences: (1) the color control is in the illumination 118 provided by the light source 116 instead of a camera; (2) more than three color component images 134, 144 can be observed; and (3) multiple narrow spectra of the color component images 134, 144 allow for a more wavelength tailored and therefore more efficient sharpening filter.

In FIG. 3, the light source 116 is color separated over time. A number of narrow spectrum illumination sources 116 such as light emitting diodes (LEDs), laser diodes, and/or filtered bulbs, are lit one at a time and electronically switched on and off under control of the computer/microprocessor 130. In one embodiment, the switching is determined by a signal 114 from the autofocus controller 138. The color separation can also be achieved with, for example, one bulb and a filter wheel. The light 118, illuminates the object 16, resulting in a spectrally narrow light response 120 which contains object information. The light 124 emitted from the objective 122 is as spectrally narrow as the light 118 from the illumination source 116. Accordingly, the objective 122 is not required to be color compensated and can have a simple construction. Thus, in one embodiment of FIG. 3, a GELTECH 350140 lens, which is non-color compensated, was used with good results.

Although fluorescence in the object 16 can broaden, duplicate, or shift the spectral light response, the camera or cameras 126 will still detect the image 124 provided that the camera or cameras 126 can detect the frequency band caused by the fluorescence. Also, to obtain an optimal focus for the fluorescent contribution to the image one or more additional auto-focus steps can be required if the fluorescent response is at different frequency band(s) than the other frequency bands being detected.

The image 124 emerging from the objective 122 impinges on a black and white camera 126 resulting in a black and white image 128, which is grabbed in a frame grabber 132. A black and white camera 126 can be used because, in this embodiment, the illumination source 116 performs color separation. Also, the camera 126 can be analog or digital. The frame grabber information (an image signal) 136 is provided to the autofocus controller 138. The position of the objective 122 is determined by the focusing mechanism 54 which is controlled through selector 50 from the autofocus controller 138, or from a manual focus controller 46. The objective 122 scans along the z-axis of the optical system 110 so that the image 134 corresponding to the optimal focus position for that image can be determined and stored in image store 142 by means of a storage synchronization signal 140 from the autofocus controller 138. After optimizing the focus for a given color component image 134, the next color component image is selected and the procedure repeats until all the desired component images have been grabbed and stored.

The registration of the color component images 144 can begin as soon as the first two color component images have been grabbed. The registration controller 146 registers each of the 'n' image components into an 'n' component registered image 148. In the image processor 150, one or more wavelength dependent sharpening filters can be applied to each of the color components of the registered image 148. Since this filtering is applied to separate colors, that is, the narrow color components (frequency bands), rather than a full color RGB image, the sharpening filters can be selected to be more precise and efficient.

Because different frequency bands can be selected from the source 12, 116, the number of frequency bands and therefore, frequency responses can be greater than the three typical responses of red, green, and blue. For example, an image detected from a frequency band corresponding to the 525 nanometer wavelength can be optimally focused and sharpened and a frequency band corresponding to the 565 nanometer wavelength can be optimally focused and sharpened. Since both of these frequency bands correspond to the color green, these optimal images can be combined to express the color green.

If a color image 68 is to be presented to an operator on the computer monitor 70, the sharpened color component images 152 should be transformed into the usual RGB format. This transformation can be achieved, for example, with pixel-wise linear combinations by multiplying each 'n' by 1 pixel vector of the registered image 148 with a 3 by 'n' weight matrix in a weight matrix calculator 154, resulting in one 3 by 1 RGB vector for each pixel. The weights can be adjusted by trial and error or calculated in order to make the resulting image behave much like a specific combination of an RGB camera and light source.

The weight matrix also permits simulation of different cameras than the camera or cameras 126 used by the optical system. The conversion is done by multiplication of each pixel of each optimal image with corresponding constants. Each constant is the response in the sensor to be simulated divided by the response in the sensor of the camera 126. The simulated responses are color dependent and can be measured or derived from a data sheet. Then, the frequency bands corresponding to each of the colors (red, green, or blue), converted or unconverted, are added together. For example, the pixels for a 525 wavelength frequency band and a 565 wavelength frequency band would be added to together to form the green component of the RGB image 68. In order not to cause an overflow in a possible integer representation of the outgoing RGB image, the sum for each pixel can be scaled by the weight matrix calculator 154. The complete procedure of multiplying, adding, and scaling can be implemented using a single weight matrix.

With the optical system 80 illustrated in FIG. 2, the object 16 yields at least a response from each visible wavelength in either the red, green, or the blue component to the camera 32. In the partitioned illumination system, 110, however, the number of color components as well as their dominant wavelengths and spectral widths must be selected to provide a total spectrum that is sufficient to obtain a response from at least the interesting wavelengths of the actual application. Indeed, a good choice of light sources provides better color discrimination than from white light illuminated RGB systems 10, 80 because some wavelengths in the white light illumination or any wide spectrum illumination, do not carry any information about the object 16. Thus, the photons from these wavelengths expose the camera sensors without contributing any information. Therefore, in the worst case, a white light optical system can require that the sensor integration time be kept short to avoid saturating a camera sensor.

Another aspect of one embodiment of the invention provides for the amalgamation of adjoining and/or overlapping optimal images captured from different portions of the object to obtain a wider view of the object using techniques known in the art. This aspect is particularly useful for objectives which have a small field of view.

Also, while the embodiments of this invention have been described as including a frame grabber 62, 132, a frame grabber is not required if an image store 94, 142 can accept a detected image directly from the camera(s) 32, 126 or if the camera(s) can store at least one image.

While this invention has been described in terms of specific embodiments, this invention, including this disclosure and appended claims, is not so limited and is to be construed in accordance with the full spirit and scope of the invention including alternatives and modifications made apparent to those skilled in the art.

We claim:

1. An optical system comprising:
   an objective which receives electromagnetic radiation from an object, modifies the electromagnetic radiation, and emits the modified electromagnetic radiation as an image of the object;
   a focusing mechanism which controls the movement of the objective along at least one path to modify the image;
   one or more cameras which detect separate images for each of a plurality of frequency bands of the modified electromagnetic radiation of the image emitted by the objective; and an automatic focus controller which, in accordance with the detected images: (1) provides control parameters to the focusing mechanism; and (2) determines for each of the frequency bands, an optimal image which corresponds to an optimal focus of the objective for that frequency band.

2. The optical system of claim 1, wherein the automatic focus controller further comprises:

a filter calculator for receiving the detected images as image signals and for generating filtered image signals such that noise components of the image signals have been reduced, the noise components being reduced by increasing energy contributions from parts of the image signals which contribute a relatively larger proportion to image components than the noise components and by decreasing energy contributions from other parts of the image signals which contribute a relatively larger portion to the noise components than to the image components;

an energy calculator for receiving the filtered image signals and determining energy levels of the filtered image signals; and a control calculator for receiving the energy levels and for generating the control parameters in accordance with the energy levels.

3. The optical system of claim 1, further comprising:

a registration controller which aligns a plurality of optimal images.

4. The optical system of claim 3, wherein the registration controller further comprises:

a transformer for receiving a first optimal image and a transformation, and for generating a transformed image, the transformation capable of translating, rotating, and/or magnifying the first optimal image;

a compositor for combining a second optimal image and the transformed image to generate a composite image;

an energy calculator for receiving the composite image and for determining an energy level of the composite image; and a transformation generator for receiving the energy level and for generating the transformation in accordance with the energy level such that the transformation selected corresponds to a focus for the composite image.

5. The optical system of claim 1, further comprising:

a source of electromagnetic radiation capable of emitting electromagnetic radiation in different frequency bands and of selectively emitting electromagnetic radiation from only one of the frequency bands.

6. The optical system of claim 5, wherein the source further comprises:

a plurality of separate sources, each separate source corresponding to one or more of the different frequency bands.

7. The optical system of claim 1, wherein:

one or more of the frequency bands produce a response only from respective portions of the object.

8. The optical system of claim 1, wherein:

the objective lacks significant color compensation.

9. The optical system of claim 1, wherein:

one or more of the images are detected at different times.

10. The optical system of claim 1, wherein:

the objective is selected such that the optimal focus for each frequency band occurs at a different position along the path of the objective.

11. The optical system of claim 1, wherein:

the objective provides optimal focus positions which are monotonically related to the frequency bands.

12. The optical system of claim 1, wherein:

a single unidirectional movement of the objective along the path reveals the optimal focus for each of the frequency bands.

13. The optical system of claim 1, further comprising:

one or more image sharpening filters, each filter optimized for a particular frequency band.

14. The optical system of claim 1, wherein the camera comprises:

a single black and white camera.

15. The optical system of claim 1, wherein at least three of the frequency bands correspond to red, green, and blue color components of visible light.

16. The optical system of claim 1, further comprising:

a converter for transforming each n by 1 pixel of a composite image using a weight matrix to generate a respective 3 by 1 pixel for an RGB image, where n is the number of frequency bands.

17. A method for operating an optical system comprising the steps of:

illuminating an object with electromagnetic radiation from a source;

modifying electromagnetic radiation from the object through an objective to form an image of the object;

controlling the movement of the objective along at least one path to modify the image;

detecting separate images for each of a plurality of frequency bands of the electromagnetic radiation;

providing control parameters for controlling the movement of the objective; and determining from the detected images for each of the frequency bands, an optimal image which corresponds to an optimal focus of the objective for that frequency band.

18. The method of claim 17, wherein the step of controlling the movement of the objective, further comprises the step of:

moving the objective only in one direction to reveal the optimal focus for each of the frequency bands.

19. The method of claim 17, further comprising the step of:

sharpening one or more of the optimal images using a filter optimized for the respective frequency band.

20. The method of claim 17, further comprising the step of:

aligning two or more of the optimal images with each other.

* * * * *